Feb. 26, 1924.
J. MORLEY
1,484,899
JACK WHEEL FOR AUTOMOBILES
Original Filed Dec. 1, 1919    2 Sheets-Sheet 1
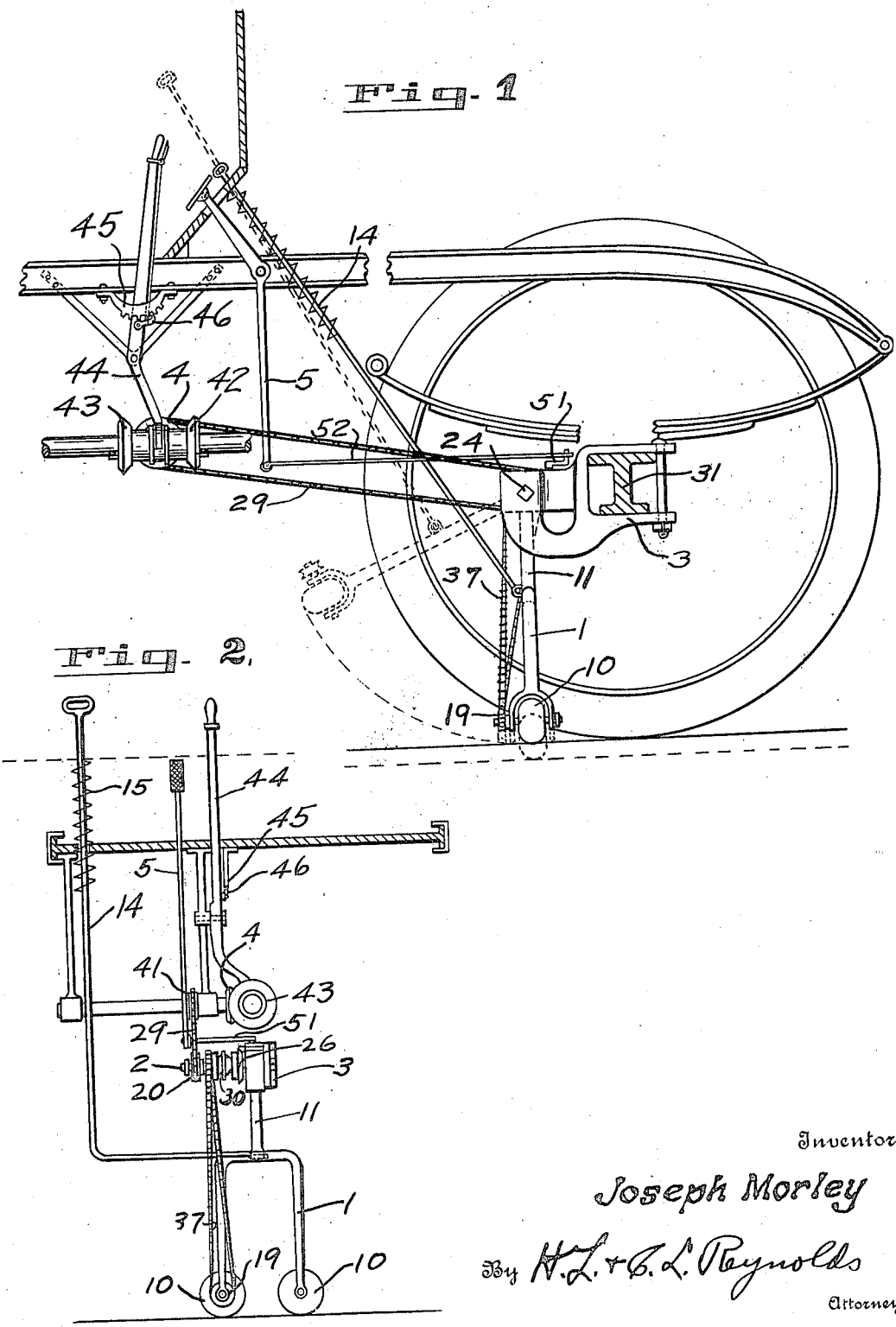
Inventor
Joseph Morley
By H. L. & C. L. Reynolds
Attorneys Feb. 26, 1924.
J. MORLEY
1,484,899
JACK WHEEL FOR AUTOMOBILES
Original Filed Dec. 1, 1919    2 Sheets-Sheet 2
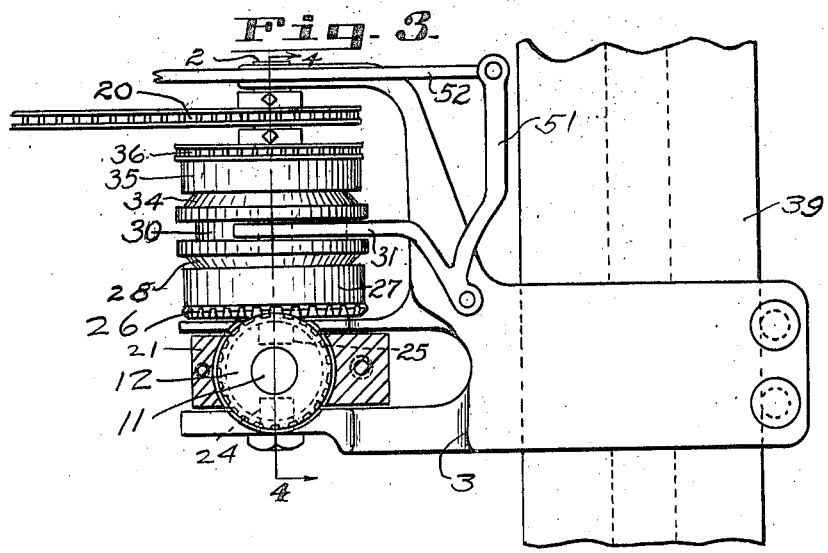
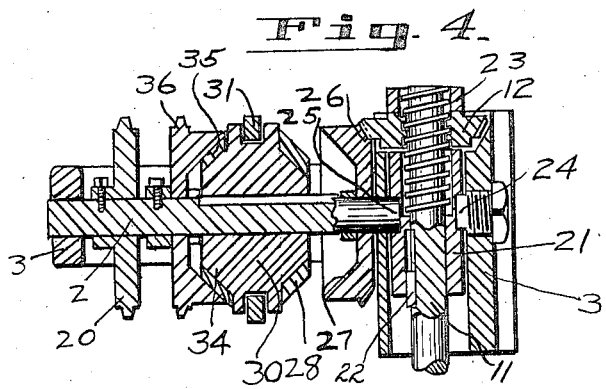
Inventor
Joseph Morley
By H.L. & S.L. Reynolds
Attorneys Patented Feb. 26, 1924.

1,484,899

UNITED STATES PATENT OFFICE.

JOSEPH MORLEY, OF SAN FRANCISCO, CALIFORNIA, ASSIGNOR TO HENRIETTA SITTENFELD (FEME SOLE), OF SAN FRANCISCO, CALIFORNIA.

JACK WHEEL FOR AUTOMOBILES.

Application filed December 1, 1919, Serial No. 341,752. Renewed November 15, 1921. Serial No. 515,432.

*To all whom it may concern:*

Be it known that I, JOSEPH MORLEY, a citizen of the United States of America, and resident of San Francisco, county of San Francisco, California, have invented certain new and useful Improvements in Jack Wheels for Automobiles, of which the following is a specification.

My invention relates to jack wheels for automobiles.

The object of my invention is to provide means whereby an automobile may be lifted from its running wheels at one or at both ends and moved laterally. Preferably both the raising and lateral movement are accomplished by means of the automobile engine, though either or both of these operations may take place through manually-operated means.

The present invention contemplates the use of an auxiliary frame carrying a jack wheel and connected to main frame of the vehicle in a manner permitting it to be raised to an inconspicuous position when not in use; the structure also embodying driving means for raising the vehicle relative to the auxiliary frame and for driving the jack wheel for laterally moving the vehicle. The driving means are controlled by clutches operable from the driver's seat in the vehicle.

One form which the invention may assume is exemplified in the following description and illustrated by way of example in the accompanying drawings, in which:

Figure 1 is a longitudinal sectional view through portions of an automobile, illustrating my device in side elevation and attached to the automobile.

Figure 2 is a transverse sectional view through the automobile at right angles to the view shown in Figure 1.

Figure 3 is a plan view of a portion of my device.

Figure 4 is a vertical sectional view on line 4—4 of Figure 3 of a portion of my device, parts being broken away.

It is often desirable for an automobilist to be able to shift his car laterally to a greater degree than is possible with the ordinary running wheels, that is, at an angle more nearly approaching 90°. For instance, if he wishes to park his car at the curb and there is not sufficient space in which to maneuver his car to reach the curb, it is desirable to be able to move the car laterally up to the curb without relying upon the running wheels. With the aid of my device this may be accomplished. The motorist may stop opposite the opening at the curb and by use of my device with a jack wheel at each end of the car, he may move the car bodily side-wise to the curb. If the opening is a little greater but yet not sufficient to permit maneuvering the car, the motorist may bring one end of his car to the curb and by operating my device at the other end of the car this end may be swung in to bring the car parallel with the curb.

The frame 1 of my device carries one or more jack wheels, 10. The upper end, 11, of the frame 1, or an end secured to the frame 1, I prefer to form as a jack screw. This jack screw 11 is engaged by a rotatable nut 12 and the screw is held against movement by a frame 21 and key 22. By means of this key, 22, the jack 11 may be rotated and thus moved vertically as the nut 12 is held against vertical movement by means of a cap or plate 23. Preferably the frame 21 is adapted to swing so that the jack wheels may be swung upward from contact with the pavement and kept in this position normally. The frame 1 is shown herein as pivoted by means of trunnions 24 and 25 which are secured in a fixed frame 3, which in turn may be secured to the car axle 31 or any other fixed member of the car frame, in any suitable manner. A means for swinging the frame 1 from its normal position is shown herein as the rod 14 which is pivoted upon the frame 1 and which projects upward into position to be operated from the driver's seat. The spring 15, or any similar device, may be employed to support the frame 1 in its normal raised position.

The nut 12 which engages the jack 11 is preferably formed as a bevel gear, or with a bevel gear attached thereto. It is adapted to mesh with a gear 26 which is mounted upon but not fixed to the shaft 2. Fixed to or integral with the gear 26 is half, 27, of a suitable clutch mechanism. The other half of the clutch mechanism, as 28, is secured upon a clutch member 30. This may be engaged by a yoke 31 to shift it into or out of engagement. The clutch member 30 is secured to turn with the shaft 2 and to be movable axially thereon.

Means for turning the shaft 2, as shown herein comprises the sprocket wheel 20 which is secured thereon and may be rotatable from the engine shaft through a chain 29 which connects with any suitable clutch mechanism, which connects the shaft 2 with the engine shaft. The clutch which I have shown herein consists of a frictional disk 4 fixed on a shaft which carries a sprocket wheel 41 over which the chain 29 is run. Engageable with the disk 4 are two opposed disks 42 and 43 which are mounted upon the engine shaft and which are movable axially thereon by means of a lever 44. This lever may extend upwardly into position to be operated from the driver's seat. If desired, a toothed segment 45 engageable by spring pressed pawl 46 may be employed to hold the disks 42 and 43 in the desired position.

With the jack wheel 10 in contact with the pavement one of the clutch disks 42 or 43 may be engaged with the disk 4 to turn the shaft 2 through the connection as described. If the clutch members 27 and 28 are in engagement at this time the nut 12 will be rotated and the jack screw 11 raised or lowered according to the direction of rotation of the nut. This will raise or lower the car at this end, if the car is raised its weight will be supported upon the jack wheels 10, instead of upon the running wheels. By engaging the other of the clutch members 42 and 43 it is evident that the first action will be reversed, that is, if the first action was to raise the car upon the jack wheels, 10, by reversing the clutch at 4 the car will be lowered upon its running wheels. While the car is supported on the jack-wheels 10 it may be moved laterally, and it is conceivable that these wheels might be so arranged that the car might be moved in any desired direction while supported thereon. This might be done by hand or through the action of some outside agency, but I prefer to provide means for moving the car laterally by means of the power of its own engine. It is evident also, that the nut 12 might be turned manually to raise the car upon the jack wheels if this were desirable.

The means which I employ for moving the car laterally comprise an operative connection between the shaft 2 and the jack wheel 10. By shifting the clutch member 30 so that the clutch cone 34, upon its face opposite to the clutch cone 28, is engageable with the complemental clutch member 35 which is secured to a sprocket 36, the shaft 2 being rotated, it is evident that this sprocket member 36 will be rotated. A chain 37 is carried by the sprocket member 36 and runs over a sprocket 19 carried upon the jack wheel shaft. If desired the chain 37 might be replaced by a belt and the sprockets 36 and 19 by pulleys or sheaves. When the clutch members 34 and 35 are in engagement the car may be shifted laterally to one side or the other by engaging one or the other of the clutch disks 42 or 43 with the disk 4 in the manner previously described. Means for shifting the clutch member 30 laterally are provided in the bell-crank lever 5 which may be positioned to be operated from the driver's seat and which is connected to the bell-crank lever 51 which carries the yoke 31 by means of a suitable rod, 52.

What I claim as my invention is:

1. The combination with a vehicle of a frame therebeneath movable towards and from the pavement, a lateral-transfer jack wheel journaled in the lowermost portion of said frame, and adapted to contact with the pavement when said frame is lowered, means for vertically lifting the vehicle upon said frame, means for rotating said jack wheel, a clutch controlling the application of power to either of said vertical lift means or said wheel, and a second clutch controlling the direction of rotation of said first clutch.

2. The combination with a vehicle of a frame therebeneath movable towards and from the pavement, a lateral-transfer jack wheel journaled in the lowermost portion of said frame, and adapted to contact with the pavement when said frame is lowered, means for vertically lifting the vehicle upon said frame, a shaft operatively connected to said vertical lift means and to said wheel, a clutch slidable on said shaft to control the application of power to either of said vertical lift means or said wheel, and a second clutch controlling the direction of rotation of said shaft.

3. In combination with a vehicle of a jack frame connected to the frame of said vehicle, a jack shaft about which said jack frame is turnable, a jack wheel journalled in the lower end of said jack frame, a chain and sprocket connection between said jack shaft and said wheel, a chain and sprocket connection between said shaft and the driving shaft of the vehicle, rotatable raising means for lifting said vehicle on said jack frame, a clutch on the driving shaft adapted to drive either the raising means or the jack wheel, and a clutch on the vehicle drive shaft whereby the jack shaft may be driven in either direction.

4. In combination with a vehicle, of a jack frame connected to the frame of said vehicle, a jack shaft about which said jack frame is turnable, manually actuated means for turning said frame on said shaft, a driving connection between said shaft and the vehicle drive shaft, a driving connection between the jack shaft and a jack wheel carried at the lower end of the jack frame, a jack screw formed on the upper end of the jack frame, a nut on said screw fixed relative to the vehicle frame whereby rotation of said nut will either raise or lower the jack frame relative to the vehicle, and a clutch on the jack shaft which may be actuated to impart the driving action of the said shaft to either the nut on the jack screw or the jack wheel, and a clutch on the vehicle drive shaft whereby the jack shaft may be driven in either direction.

Signed at Seattle, King County, Washington, this 25th day of November 1919.

JOSEPH MORLEY.